United States Patent [19]

Chi

[11] Patent Number: 5,129,263
[45] Date of Patent: Jul. 14, 1992

[54] MASS FLOWMETER

[75] Inventor: Hung N. Chi, Reutlingen, Fed. Rep. of Germany

[73] Assignee: Krohne Messtechnik Massametron GmbH & Co. KG, Pliezhausen, Fed. Rep. of Germany

[21] Appl. No.: 526,094

[22] Filed: May 18, 1990

[30] Foreign Application Priority Data

May 19, 1989 [DE] Fed. Rep. of Germany ....... 3916285

[51] Int. Cl.$^5$ ................................................. G01F 1/84
[52] U.S. Cl. ................................................. 73/861.38
[58] Field of Search ........................ 73/861.37, 861.38

[56] References Cited

U.S. PATENT DOCUMENTS

| 3,927,565 | 12/1975 | Pavlin | 73/861.38 X |
| 4,628,744 | 12/1986 | Lew | 73/861.38 |
| 4,716,771 | 1/1988 | Kane | 73/861.38 |
| 4,763,530 | 8/1988 | Mizerak | 73/861.38 |
| 4,801,897 | 1/1989 | Flecken | 73/861.38 |
| 4,856,346 | 8/1989 | Kane | 73/861.38 |

FOREIGN PATENT DOCUMENTS

| 0233327 | 9/1988 | Japan | 73/861.38 |
| 0314415 | 12/1988 | Japan | 73/861.38 |

Primary Examiner—Herbert Goldstein
Attorney, Agent, or Firm—Cesari and McKenna

[57] ABSTRACT

A mass flow meter for flowing media, which operates on the Coriolis Principle, has a conduit inlet, a conduit for carrying a flow medium, a conduit outlet, a carrier system carrying the conduit, the conduit inlet and the conduit outlet, at least one oscillator acting on the conduit and at least one measuring device detecting Coriolis oscillation based on a Coriolis force or forces. The mass flow meter is especially appropriate for technical manufacturing, measuring and operating requirements because the conduit is designed in a meandering form and has an inlet bend, at least two return bends, an outlet bend and connecting pieces in between.

23 Claims, 5 Drawing Sheets

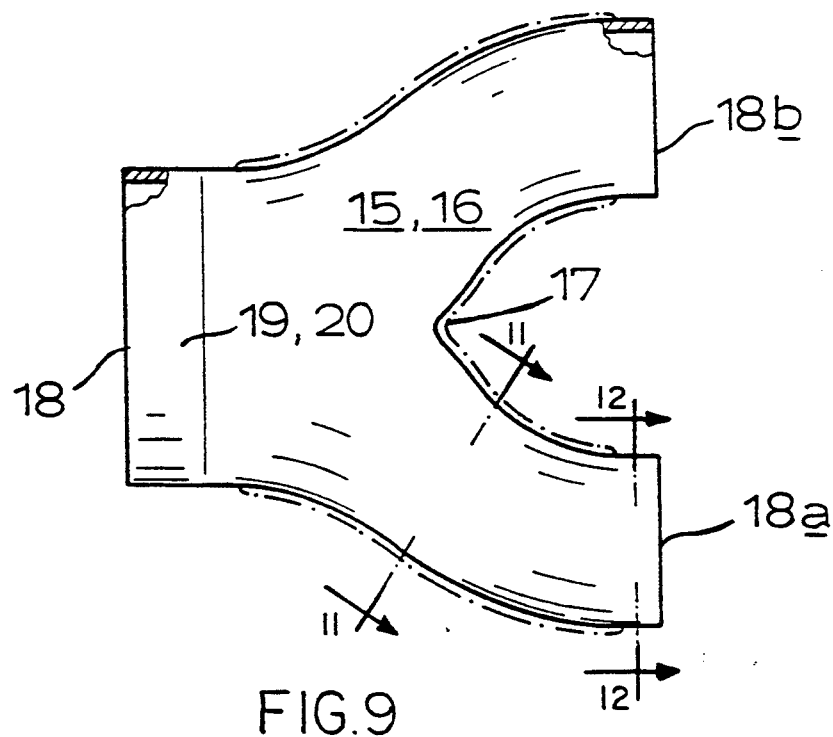
FIG. 9
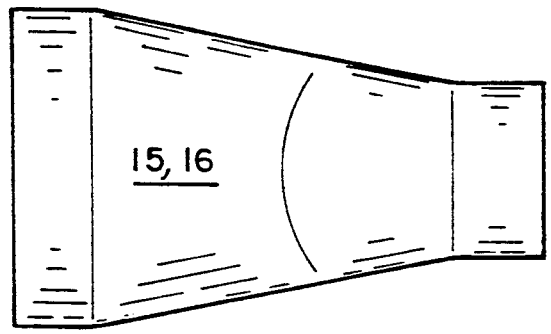
FIG. 10
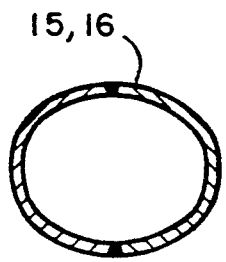 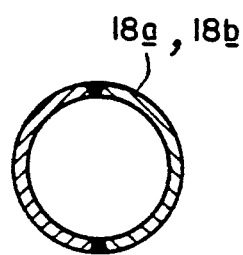
FIG. 11  FIG. 12

MASS FLOWMETER

The invention concerns a mass flow meter for flowing media, which works according to the Coriolis Principle, with a conduit inlet, a conduit that conducts the flow medium, a conduit outlet, a holding system holding the conduit inlet, the conduit and the conduit outlet, with at least one oscillator acting on the conduit and at least one measuring device detecting Coriolis rotations based on the Coriolis force or forces.

BACKGROUND OF THE INVENTION

Various versions of mass flow meters for flow media that operate on the Coriolis Principle are known (compare, for example, German Disclosure Documents 26 29 833, 28 22 087, 28 33 037, 29 38 498, 30 07 361, 33 29 544, 34 43 234, 35 03 841, 35 05 166, 35 26 297 and 37 07 777, European Disclosure Documents 0 083 144, 0 109 218, 0 119 638, 0 185 709, 0 196 150, 0 210 308, 0 212 782, 0 235 274, 0 239 679, 0 243 468, 0 244 692, 0 250 706, 0 271 605, 0 275 367 and 0 282 552, and U.S. Pat. Nos. 4,491,009, 4,628,744 and 4,666,421), and are being used to an increasing extent in practice.

All state-of-the-art mass flow meters for flowing media that operate on the Coriolis Principle have in common that they do not yet optimally meet technical manufacturing, measurement and/or operational requirements, so that the task of the invention is based on providing a improved mass flow meter.

The mass flow meter of the invention is basically characterized by the fact that the conduit is meandering in shape and has one inlet bend, at least two Siamese joints and an outlet bend with connecting pieces in between The form of this novel mass flow meter, operating on the Coriolis Principle, has substantial technical manufacturing, measuring and operating advantages.

BRIEF DESCRIPTION OF THE DRAWINGS

In the following, various versions of the invention will be explained in connection with the examples of execution shown in the accompaning drawings, in which;

FIG. 9 is a plan view on a larger scale of a Siamese joint used in the mass flow meter according to FIGS. 4 to 7.

FIG. 10 is a side view of the Siamese joint according to FIG. 9,

FIG. 11 is a lengthwise section along line 11—11 through the Siamese joint according to FIG. 9, and FIG. 12 is a lengthwise section along line 12—12 through the Siamese joint according to FIG. 9.

DESCRIPTION OF THE PREFERRED EMBODIMENTS

Figure 1:
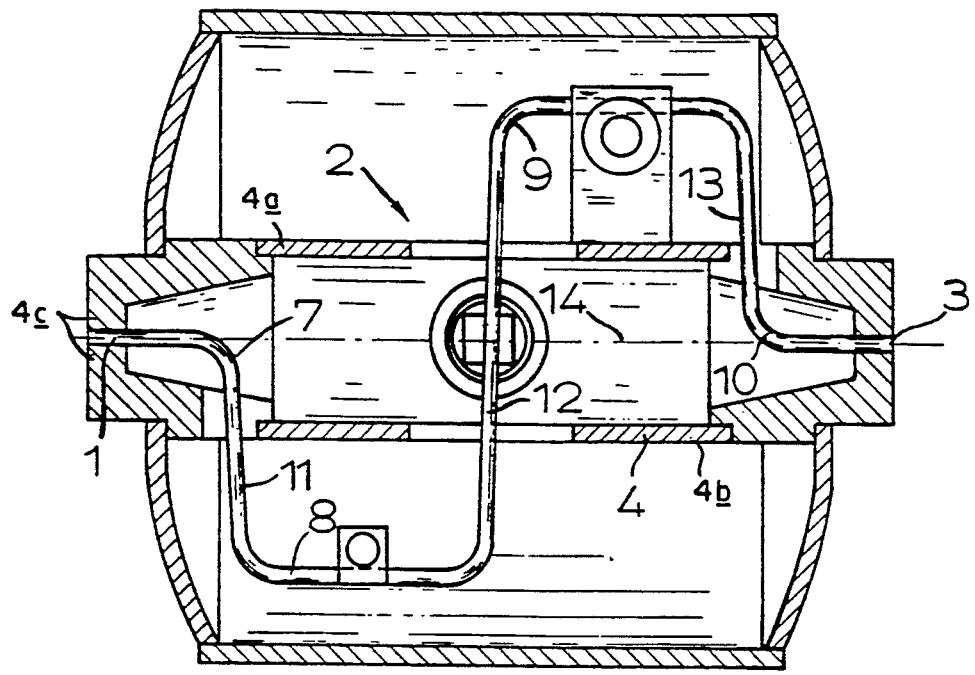
FIG. 1 is a longitudinal section through an initial version of a mass flowmeter according to the invention.

The mass flow meter shown in FIGS. 1 to 3 and FIGS. 4 to 7 designed for flow media operates on the Coriolis Principle and consists, in its basic structure, of a conduit inlet 1, a conduit 2 for carrying the flow medium, a conduit outlet 3, a carrier system 4 carrying the conduit inlet 1, the conduit 2 and the conduit outlet 3, at least one oscillator 5 acting on the conduit 2 and at least one measuring device 6 for detecting Coriolis rotations based on a Coriolis force or forces. Preferably, carrier system 4 comprises two, i.e., upper and lower in FIG. 1, mirror-image sections 4a and 4b which mate at the main axis of the flow meter.

Figure 4:
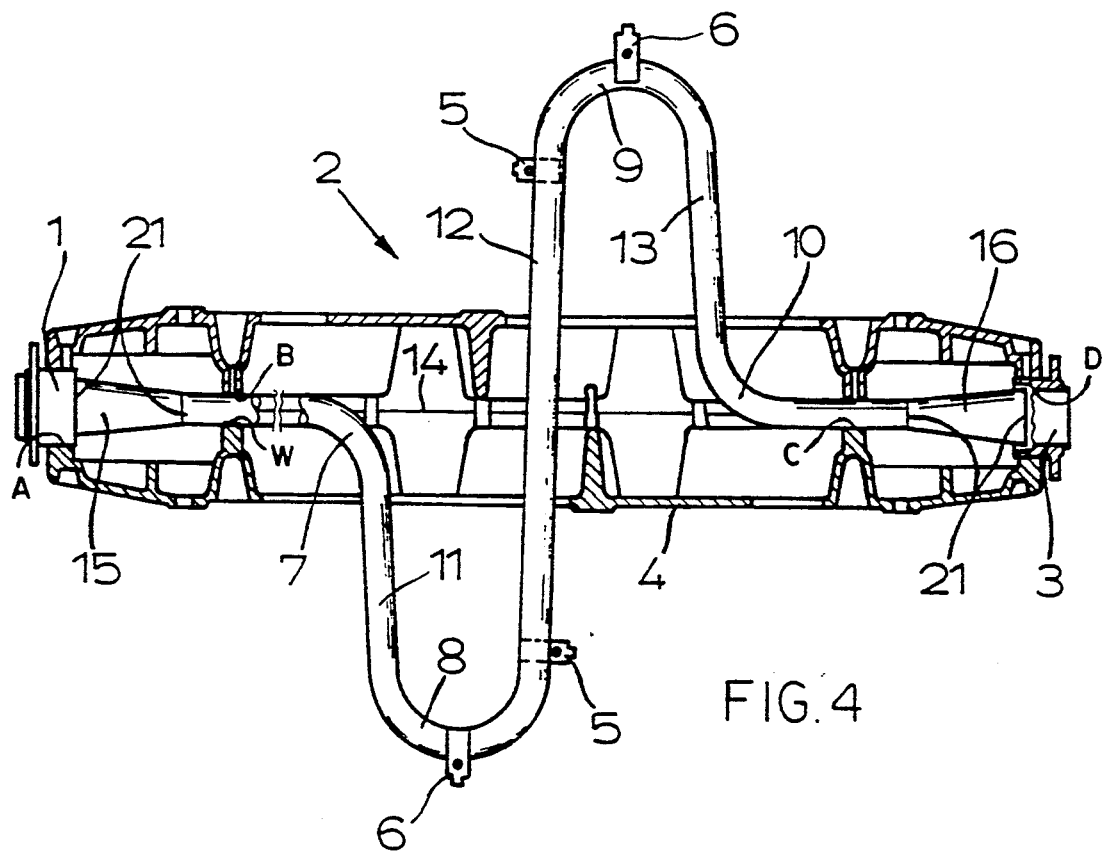
FIG. 4 is a longitudinal section through a second form of execution of a mass flow meter according to the invention.
Figure 5:
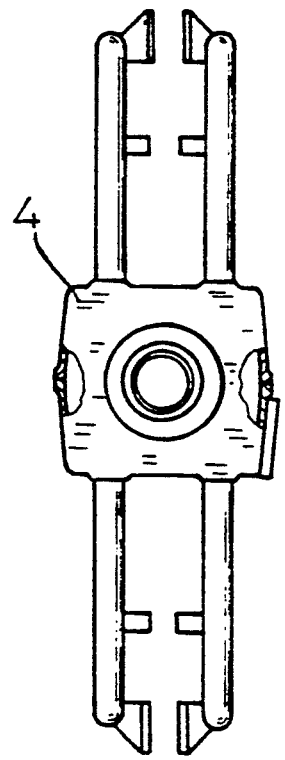
FIG. 5 is a side view of the mass flow meter according to FIG. 4.
Figure 6:
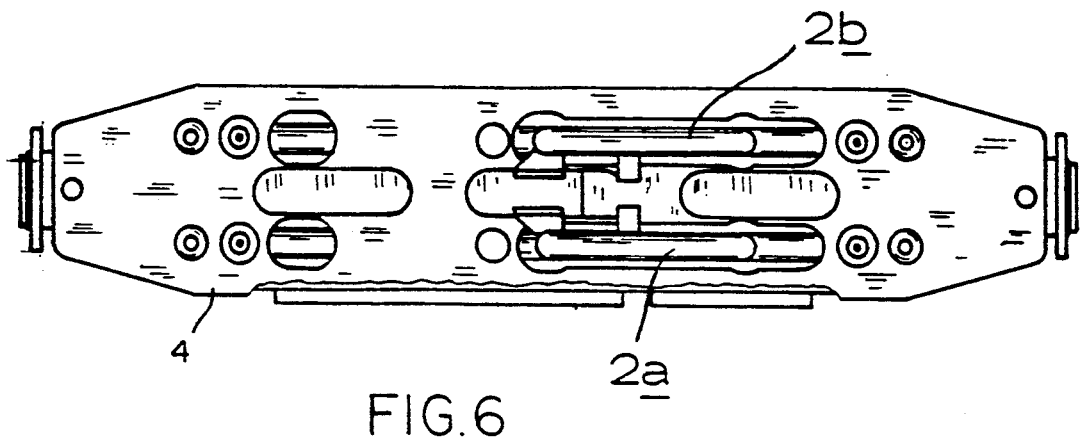
FIG. 6 is a plan view of the mass flow meter according to FIG. 4.
Figure 7:
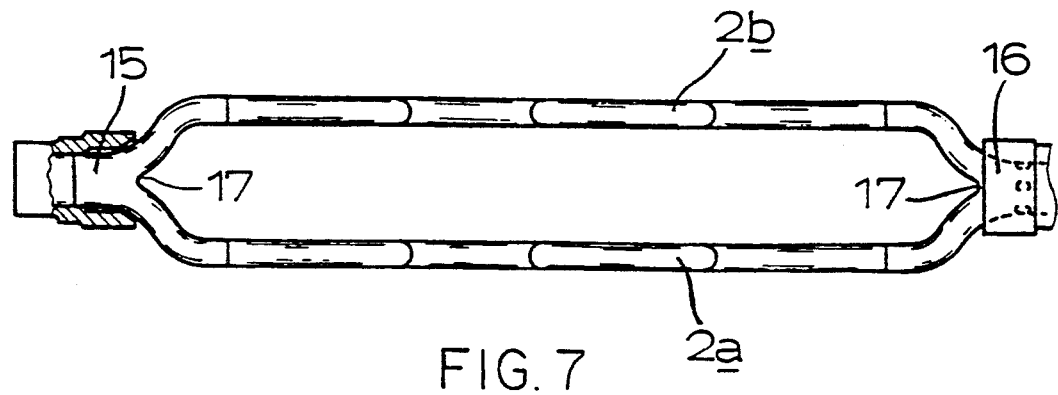
FIG. 7 is a similar view of the conduit that carries the flow medium in the mass flow meter according to FIG. 4 and showing the conduit inlet and conduit outlet.
Figures 8A, 8B, 8C:
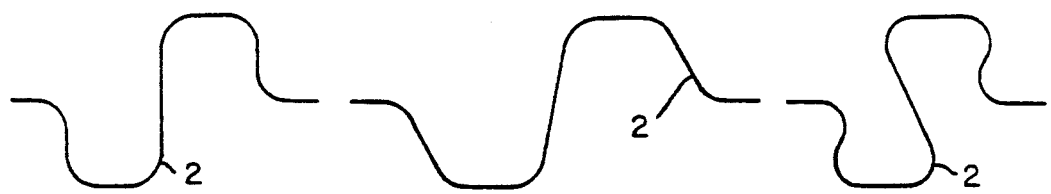
FIGS. 8A to 8I are schematic representations of basically possible configurations of the conduit for carrying the flow medium in a mass flow meter according to the invention.
Figures 8D, 8E, 8F:
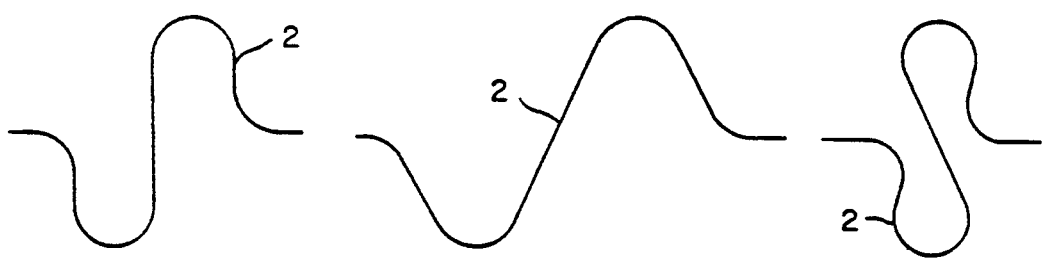
Figures 8G, 8H, 8I:
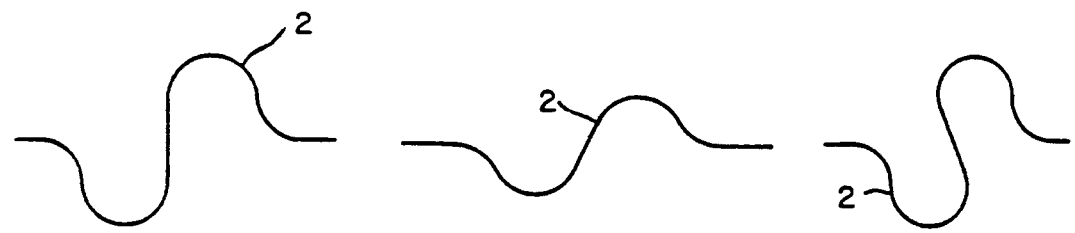

As FIGS. 1 and 4 show, the mass flow meter of the invention applies or is present if the conduit 2 is executed in a meandering form and has an inlet bend 7, two return bends 8, 9, an outlet bend 10 and connecting pieces 11, 12, 13 in between. Here the "inlet bend," "return bend" and "outlet bend" are understood functionally; thus, the pieces need not necessarily be circular arched pieces.

Figure 3:
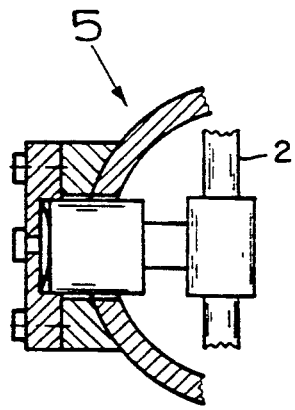
FIG. 3 is a fragmentary sectional view on a larger scale showing a portion of the FIGS. 1 and 2 flow meter in greater detail.
Figure 2:
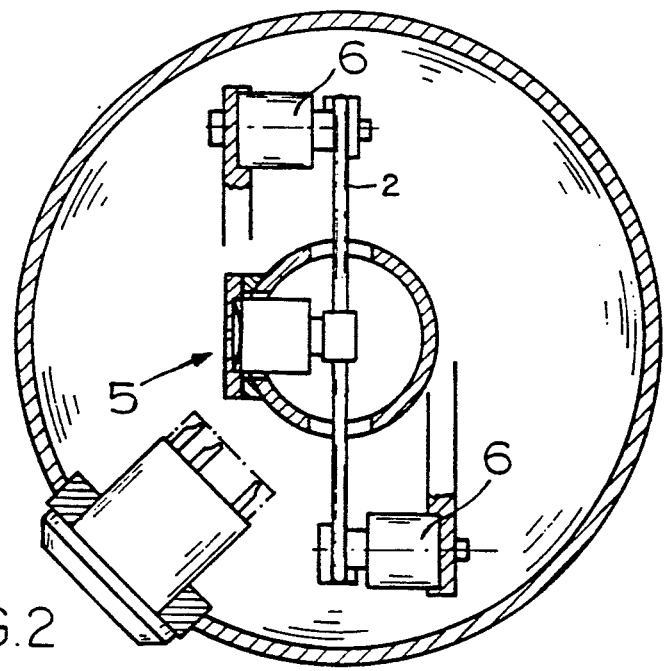
FIG. 2 is a cross section through the mass flow meter according to FIG. 1.

In both examples of execution shown in FIGS. 1 to 3, on the one hand, and in FIGS. 4 to 7, on the other hand, the connecting pieces 11, 12, 13 of the conduit 2 extend at an angle larger or smaller than 90° relative to the main axis 14.

In FIGS. 1 to 7, the mass flow meters of the invention are shown with the main axis 14, defined by inlet 1 and outlet 3, in a horizontal position. However, the mass flow meters of the invention are built preferably with the main axis in a vertical position. Then, making the connecting pieces 11, 12, 13 in the conduit 2 extend at an angle larger or smaller than 90° relative to the main axis, as shown in FIGS. 1 and 4, allows the mass flow meter of the invention to empty itself, which is a very basic advantage of the various versions of my mass flow meter.

Along with what is described above, the connecting pieces 11, 12, 13 of the conduit 2 each extends at an angle larger or smaller than 90° relative to the main axis and the inlet bend 7 and the outlet bend 10 each form an angle larger than 90°. Preferably also each return bend 8, 9 should form an angle larger than 180°. Thus for example, in the FIG. 1 flow meter, the sum of the two angles between connecting piece 11 and connection piece 12 is greater than 180°. The same is true for the return bend 9 defined by the two legs 12 and 13. FIGS. 8A to 8I show various possible conduit 2 shapes that may be used in flow meters incorporating the invention.

In both versions of mass flow meters of the invention shown in FIGS. 1 to 3, on the one hand, in in FIGS. 4 to 7, on the other hand, the conduit inlet 1 and the conduit outlet 3 are arranged coaxially to one another. The result, then, is that the mass flow meter of the invention can be constructed in a conduit system running in a straight line.

For proper operation of the mass flow meter of the invention, it is especially important that the conduit be firmly attached to the carrier system 4 in four places, namely at the start of the conduit 2 inlet 1, adjacent to the conduit inlet 1, adjacent to the conduit outlet 3 and at the end of the conduit outlet 3. These attachments may be clamping protuberances on carrier system 4 as shown at 4c in FIG. 1. Also, the attachments may include welds as shown at W in FIG. 4.

In the version of the mass flow meter shown in FIGS. 4 to 7, the conduit 2 has two partial flow conduits 2a, 2b(FIGS. 6 and 7) that are parallel to each other not only in terms of their spatial position but also in terms of mass flow through the partial conduits. Both partial conduits 2a, 2b of the conduit 2 are connected to one another via a Siamese joint 15, 16 (FIGS. 4 and 7) downstream from the conduit inlet 2 and upstream from the conduit outlet 3. As shown in FIGS. 9 to 12, the Siamese joints 15, 16 are wedge-shaped at the fork 17 and have steadily decreasing contours between their large total cross section 18 and both smaller partial cross sections 18a, 18b. In other words, there are no steps between the larger cross section and the smaller cross sections. Also, the Siamese joint 15 on the input side and the Siamese joint 16 on the output side each have a large-volume decoupling chamber 19, 20 which minimize fluid pressure variations which might otherwise be coupled from conduit 2 to inlet 1 and outlet 3. Preferably each joint 15, 16 is composed of mirror image section welded together as shown in FIGS. 11 and 12.

As described previously, for the versions of the invention mass flow meter shown in FIGS. 4 to 7, the conduit 2 has two solid partial flow conduits 2a, 2b parallel to one another. In this case, conduit 2 is firmly attached by clamping, weldments, etc. to the carrier system 4 at a total of six places A to D, namely at the beginning of the conduit inlet 2 (Point A), at the beginning of each partial conduit 2a, 2b (Point B), at the end of each partial conduit 2a, 2b (Point C) and at the end of the conduit outlet 3 (Point D), there being two attachment points B of C for the two partial conduits 2a, 2b. These attachments assure that the mechanical vibrations of the partial conduits 2a, 2b are decoupled at Points B and C. Since the two Siamese joints 15, 16 lie between attachment points 15, 16, no vibrations are introduced into those joints.

In the version of the mass flow meter shown in FIGS. 1 to 3, the conduit inlet 1, the conduit 2 and the conduit outlet 3 are made in one piece; it is a continuous pipe bent accordingly. In contrast to this, for the version of the invention mass flow meter shown in FIGS. 4 to 7, the conduit 2 (i.e. partial conduits 2a, 2b) is connected by weld joints 21 (FIG. 7) to the conduit inlet 1 and outlet 3. Specifically, the inlet bend 7 of the conduit 2 is connected to the Siamese joint 15, the Siamese joint 15 to the conduit inlet 1, the outlet bend 10 of the conduit 2 to the Siamese joint 16 and the Siamese joint 16 to the conduit outlet 3. Also, the conduit 2 is firmly attached to the carrier system 4 adjacent to the weld joint 21 connecting the inlet bend 7 to the conduit inlet 1 and the Siamese joint 15 and also adjacent to the weld 21 connecting the outlet bend 10 to the conduit outlet 3 and the Siamese joint 16. This has the substantial advantage that the weld joints 21 adjacent to the points of fixation, as seen from each oscillator 5, are protected from local increases in mechanical tension or strain.

As shown especially in FIGS. 1 and 4, the carrier systems 4 in the versions of the mass flow meter shown there are flexurally strong and torsion-proof. This is because the two sections 4a, 4b comprising each system 4 are domed or bridge-shaped as shown in FIGS. 1 and 4; i.e., system 4 is executed in a dual-bridge shape. This has the basic advantage that from the outside, namely from the conduit system connected to the flow meter, the resulting forces are carried via the bridge shaped carrier system 4 and thus not via the conduit 2.

In the mass flow meters of the invention, the oscillator 5 can excite the conduit 2 (and the partial conduits 2a, 2b) to torsion rotations or flexural rotations. If the oscillator 5 excites the conduit 2 or partial conduits 2a, 2b to torsion rotations, then the Coriolis force causes flexural rotations; but if the oscillator 5 excites the conduit 2 or the partial conduits 2a, 2b to flexural rotations, then the Coriolis force causes torsion rotations.

It has previously been stated that there is at least one oscillator 5 and at least one measuring device 6 in the mass flow meter of the invention. FIGS. 1 to 3 invention embodiment, there are precisely one oscillator 5 and two measuring devices 6. But also, as applies to the flow meter version in FIGS. 4 to 7, there can be two oscillators 5 and two measuring devices 6.

Concerning the oscillator(s) 5 and the measuring devices 6, there is another aspect of the invention, that of making the oscillator or oscillators and/or the measuring device or devices, respectively, out of a permanent magnetic disk and a coil that can be acted on by a permanent magnetic disk. However, it is also possible to make the oscillator or oscillators and the measuring device or devices, respectively, out of two permanent magnetic disks affixed to both partial conduits 2a, 2b and a stationary coil mounted to carrier system 4. In this version, it is recommended that the stationary coil comprise two adjacent coils separated by a decoupling disk (not shown) made out of a highly permeable material such as mu-metal.

Finally, other aspects of the invention, which are not shown in the drainage figures, include the fact that the natural frequencies of the conduit inlet 1 and of the conduit outlet 3 are substantially smaller or substantially larger than the excitation frequency of the oscillator 5 or the oscillators 5, and that the excitation frequency of the oscillator 5 or oscillators 5 is the same as the natural frequency of the conduit 2 or the natural frequency of the partial conduits 2a. 2b and/or that the difference in the tangents of the phase angle of the values of both measuring devices 6 is figured as a measurement of the flow quantity and/or that the oscillating frequency determined by the flow medium is figured as a measurement of the density.

It is to be understood that the following claims are intended to cover all of the generic and specific features of the invention described herein.

I claim:

1. A mass flow meter for flow media, which operates on the Coriolis Principle, with a conduit inlet, a conduit for carrying the flow medium, a conduit outlet, the conduit inlet and outlet defining a main axis, a carrier system extending between and holding the conduit inlet, and the conduit outlet, at least one oscillator acting on the conduit and at least one measuring device detecting Coriolis forces or Coriolis oscillations of the conduit based on Coriolis forces, wherein the conduit is built in a meandering form and has an inlet bend, at least two return bends, an outlet bend and connecting pieces in between, characterized in that the conduit (2) is firmly attached to the carrier system (4) in four separate places, namely at the start of the conduit inlet (1), adjacent to the conduit inlet (1), adjacent to the conduit outlet (3) and at the end of the conduit outlet (3).

2. A mass flow meter for flow media, which operates on the Coriolis Principle with a conduit inlet, a conduit for carrying the flow medium, a conduit outlet, the conduit inlet and outlet defining a main axis, a carrier system extending between and holding the conduit inlet, and the conduit outlet, at least one oscillator acting on the conduit and at least one measuring device detecting Coriolis forces or Coriolis oscillations of the conduit based on Coriolis forces, wherein the conduit includes two parallel partial flow conduits and is built in a meandering form and has an inlet bend, at least two return bends, an outlet bend and connecting pieces in between, characterized in that the partial flow conduits 2a, 2b are firmly attached tot he carrier system in six places, namely at the start of the conduit inlet (1), at the start of each partial conduit (2a, 2b) at the end of each partial conduit (2a, 2b) and at the end of the conduit outlet (3).

3. A mass flow meter according to claim 1 or 2, characterized in that the connecting pieces (11, 12, 13) of the conduit (2) extend at an angle or smaller than 90° relative tot he main axis (14).

4. A mass flow meter according to claim 1 or 2, characterized in that the inlet bend (7) and the outlet bend (10) each form an angle larger than 90° and the return bends (8, 9) each form an outside angle larger than 180°

5. A mass flow meter according to claim 1 or 2 characterized in that the conduit inlet (1) and the conduit outlet (3) are arranged coaxially to one another.

6. A mass flow meter according to claim 2 characterized in that both partial flow conduits (2a, 2b) of the conduit (2) are connected to one another by forked joints (15, 16), said joints being located downstream from the conduit inlet (1) and upstream from the conduit outlet (3), respectively.

7. A mass flow meter according to claim 6 characterized in that each forked joint (15, 16) is wedge shaped at its fork (17).

8. A mass flow meter according to claim 6 characterized in that the contours of the joints (15, 16) steadily decrease between their large total cross section (18) and both smaller partial cross sections (18a, 18b).

9. A mass flow meter according to claim 6 characterized in that the forked joints (15, 16) each includes a large chamber (19, 20).

10. A mass flow meter according to claim 2 characterized in that the inlet bend (7) of the conduit (2) is connected to the conduit inlet (1) and the outlet bend (10) of the conduit (2) is connected to the conduit outlet (3) by weld joints (21).

11. A mass flow meter according to claim 2 characterized in that a first weld joint (21) connects the inlet bend (7) to the conduit inlet (1) and a second weld joint (21) connects the outlet bend (10) to the conduit outlet (3) and said attachments to the carrier system (4) are adjacent said weld joints.

12. A mass flow meter according to claim 1 or 2 characterized in that the carrier system (4) includes a two sections engaging the conduit (2) and rigidly connected together.

13. A mass flow meter according to claim 12 characterized in that the carrier system (4) bridges opposite sides of conduit (2).

14. A mass flow meter according to claim 1 or 2 characterized in that the oscillator (5) excites the conduit (2) to torsion rotations.

15. A mass flow meter according to claim 1 or 2 characterized in that the oscillator (5) excites the conduit (2) to flexural rotations.

16. A mass flow meter according to claim 1 or 2 characterized by the fact that there are precisely one oscillator (5) and two measuring devices (6).

17. A mass flow meter according to claim 1 or 2 characterized in that there are two oscillators (5) and two measuring devices (6).

18. A mass flow meter according to claim 1 or 2 characterized in that oscillator and/or the measuring device, respectively, comprise coils.

19. A mass flow meter according to claim 2 characterized in that the oscillator and/or the measuring devices, respectively, consist of two permanent magnetic disks on both partial conduits and a stationary coil.

20. A mass flow meter according to claim 19 characterized in that the stationary coil comprises two adjacent coils and a decoupling disk of a highly permeable material sandwiched between said coils.

21. A mass flow meter according to claim 1 or 2 characterized in that the natural frequency of the conduit inlet (1) and the conduit outlet (3) is substantially smaller or substantially larger than the excitation frequency of the oscillator (5).

22. A mass flow meter according to claim 1 or 2 characterized in that the excitation frequency of the oscillator (5) is the same as the natural frequency of the conduit (2).

23. A mass flow meter according to claim 16 and further including means for finding the difference in the tangent of the phase angle of the value of both measuring devices (6) as a measurement of the flow mass and/or the oscillating frequency determined by the flow medium as a measurement of the density.

* * * * *